United States Patent
Iihara et al.

(10) Patent No.: US 6,422,946 B1
(45) Date of Patent: Jul. 23, 2002

(54) UNIVERSAL JOINT OUTER RACE AND METHOD FOR MANUFACTURING THE SAME

(75) Inventors: Michio Iihara; Yasushi Takahara; Yoshihiro Sagisaka, all of Shizuoka-ken (JP)

(73) Assignee: NTN Corporation, Osaka-fu (JP)

(*) Notice: Subject to any disclaimer, the term of this patent is extended or adjusted under 35 U.S.C. 154(b) by 0 days.

(21) Appl. No.: 09/539,618

(22) Filed: Mar. 31, 2000

(30) Foreign Application Priority Data

Apr. 2, 1999 (JP) .................................... 11-096617

(51) Int. Cl.[7] ............................................. F16D 3/16
(52) U.S. Cl. ..................................... 464/146; 464/906
(58) Field of Search ................................ 464/906, 139, 464/140, 141, 142, 143, 144, 145, 146

(56) References Cited

U.S. PATENT DOCUMENTS

| | | | | |
|---|---|---|---|---|
| 4,455,734 A | * | 6/1984 | Yoshioka et al. | 464/906 |
| 4,611,373 A | * | 9/1986 | Hazebrook | 464/145 |
| 4,843,864 A | * | 7/1989 | Welschof | 72/355 |
| 5,001,920 A | * | 3/1991 | Ishinaga et al. | 72/345 |
| 5,167,584 A | * | 12/1992 | Krude | 464/145 |
| 5,186,082 A | * | 2/1993 | Kuramitsu et al. | 76/107.1 |
| 5,451,185 A | * | 9/1995 | Krude et al. | 464/145 |
| 5,618,235 A | * | 4/1997 | Krude et al. | 464/145 |
| 5,788,578 A | * | 8/1998 | Shimizu et al. | 464/145 |
| 5,852,864 A | * | 12/1998 | Krude et al. | 29/898.061 |
| 5,885,162 A | * | 3/1999 | Sakamoto et al. | 464/145 |
| 5,970,776 A | * | 10/1999 | Iijima et al. | 72/353.4 |
| 6,044,684 A | * | 4/2000 | Ohama et al. | 72/354.2 |
| 6,146,281 A | * | 11/2000 | Iijima et al. | 464/139 |

* cited by examiner

Primary Examiner—Lynne H. Browne
Assistant Examiner—Kenn Thompson
(74) Attorney, Agent, or Firm—Arent Fox Kintner Plotkin & Kahn, PLLC

(57) ABSTRACT

There are provided an outer race of a constant velocity joint which has better operability and lower cost, and a method for manufacturing the same. First, an outer race 1 having a shaft portion 1a and a cylindrical portion 1b is prepared as a blank. Then with a punch set 4 fitted with an initial clearance in the radial direction into the inner periphery of the cylindrical portion 1b, the cylindrical portion 1b is pressure-inserted into the die 6 from the opening side thereof to form the ball rolling grooves 2 on the inner periphery of the cylindrical portion 1b, with the ironing operation being stopped when the ball rolling grooves of a predetermined length is formed while leaving an inner-most portion of cylindrical portion 1b intact, thereby forming a margin recess 7 for a grinding wheel at the base of the ball rolling groove 1.

2 Claims, 3 Drawing Sheets

UNIVERSAL JOINT OUTER RACE AND METHOD FOR MANUFACTURING THE SAME

BACKGROUND OF THE INVENTION

1. Field of the Invention

The present invention relates to an outer race of a universal joint having a plurality of ball rolling grooves provided on the inner periphery of a cylindrical portion which is integral with a shaft, and a method for manufacturing the same.

2. Description of the Related Art

An outer race 1 of a universal joint having crossed grooves shown in FIG. 4 is made by forming a plurality of crossed ball rolling grooves 2 inclined by a predetermined angle with respect to the axial direction on the inner periphery of a cylindrical portion 1b which is integrally made with a shaft portion 1a, and assembling a cage and a plurality of balls not shown, thereby constituting a constant velocity universal joint.

The outer race 1 of the universal joint is fabricated by applying semi-hot forging to a blank thereby to perform preliminary forming of the material substantially into a predetermined shape except for the ball rolling grooves 2, then forming the ball rolling grooves 2 by applying the so-called ironing process which is a type of cold process. The ironing process is such that, as shown in FIG. 5, a punch set 4, which can be expanded and reduced in the radial direction and has a plurality of ridges 3 of a configuration complementary to that of the ball rolling grooves 2 to be formed on the inner periphery, is fitted into the inner periphery of the cylindrical portion 1b of the outer race 1 which is a blank having been pre-formed substantially to the predetermined shape except for the ball rolling grooves 2. Under this condition, the outer periphery of the cylindrical portion 1b is ironed with a die 6 having a tapered die hole 5, while pressing the punch set 4 against the inner periphery of the cylindrical portion 1b, thereby forming the ball rolling grooves 2 of the predetermined shape on the inner periphery of the cylindrical portion 1b.

In the outer race 1 of the universal joint described above, the ball rolling grooves 2 are finished to the final dimensions by grinding, after forming the ball rolling grooves 2 in the intermediary configuration on the inner periphery of the cylindrical portion 1b by ironing process. For this purpose, in the prior art, a drill pocket which is a little deeper than the grinding allowance is machined at the base of each ball rolling groove 2 located at the innermost position in the inner periphery of the cylindrical portion 1b, as a margin recess for a grinding wheel for grinding the ball rolling grooves 2.

In the process of manufacturing the outer race 1 of the prior art, since each drill pocket is formed as a margin recess for a grinding wheel at the base of the ball rolling groove 2 by cutting operation after forming the ball rolling grooves 2 on the inner periphery of the cylindrical portion 1b by the ironing process, it is difficult to form the drill pockets by cutting due to the difficulty in determining the angular position of the drill pockets with respect to the ball rolling grooves 2 when forming the drill pockets by cutting.

Also because it is necessary to form the drill pockets in a separate machining process as a margin recess for a grinding wheel after forming the ball rolling grooves 2 on the inner periphery of the cylindrical portion 1b by ironing process, increased number of processes leads to a significant decrease in the productivity and an increase in the production cost due to the increased equipment cost.

Moreover, while each drill pocket which functions as a margin recess for a grinding wheel is formed by cutting, the cutting process tends to cause a margin recess for a grinding wheel having excessive depth to be formed and therefore leads to the possibility of such troubles as the ball falling into the drill pockets during assembly.

SUMMARY OF THE INVENTION

The present invention has been made for the purpose of solving the problems described above, and an object thereof is to provide an outer race of a constant velocity joint which has better operability and lower cost, and a method for manufacturing the same.

In order to achieve the object described above, the present invention provides an outer race of a universal joint, the outer race comprising a shaft portion and a cylindrical portion formed on one end of the shaft portion, fabricated by fitting a punch set having a plurality of ridges of a configuration complementary to that of ball rolling grooves to be formed on an inner periphery of the cylindrical portion into the inner periphery of the cylindrical portion of the outer race which is a blank, and forming the ball rolling grooves on the inner periphery of the cylindrical portion by ironing with the cylindrical portion being pressure-inserted into a die. The ironing operation is stopped when the ball rolling grooves of a predetermined length is formed at the base of the ball rolling grooves by ironing with the cylindrical portion inserted from the opening side thereof while leaving the inner-most portion of cylindrical portion intact, thus forming a margin recess for a grinding wheel.

Also the present invention provides a method for manufacturing an outer race of a universal joint, comprising the steps of providing an outer race which is a blank having a shaft portion and a cylindrical portion formed on one end of the shaft portion, fitting a punch set, which has a plurality of ridges of the configuration complementary to that of ball rolling grooves to be formed on the inner periphery of the cylindrical portion, into the inner periphery of the cylindrical portion of the outer race, and forming the ball rolling grooves on the inner periphery of the cylindrical portion by ironing with the cylindrical portion being pressure-inserted into the die. The method further comprises the steps of fitting the punch set into the inner periphery of the cylindrical portion with an initial clearance secured therebetween in the radial direction, forming the ball rolling grooves on the inner periphery of the cylindrical portion by ironing with the cylindrical portion being pressure-inserted into the die from the opening side thereof, and stopping the ironing operation when the ball rolling grooves of a predetermined length is formed while leaving an unformed portion at the base of the ball rolling grooves, thereby forming the margin recess for a grinding wheel.

According to the present invention, since the ironing operation is stopped when the ball rolling grooves of the predetermined length is formed by ironing of the cylindrical portion of the outer race on the opening side thereof thereby forming the margin recess for a grinding wheel at the base of the ball rolling grooves while leaving the inner-most portion of cylindrical portion intact, it is made possible to eliminate the separate process of forming the margin recess for a grinding wheel by cutting operation which is employed in the prior art.

These and other objects and advantages of the present invention will become clear from the following description with reference to the accompanying drawings

DETAILED DESCRIPTION OF THE PREFERRED EMBODIMENTS

An embodiment of the present invention will be described below with reference to the accompanying drawings.

Figure 1C:
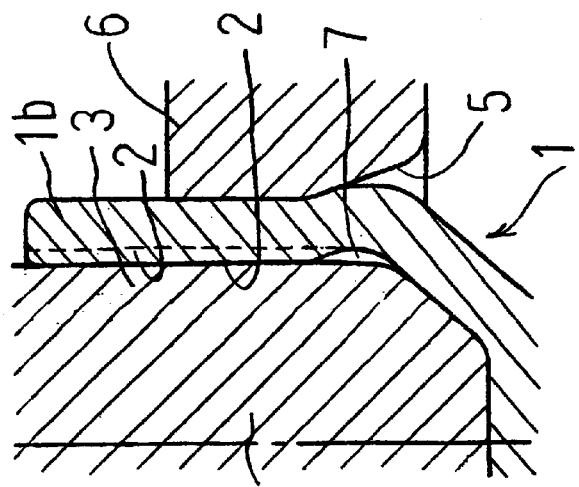
FIG. 1(a) through FIG. 1(c) are sectional views sequentially showing ironing operation of the present invention.
Figure 1B:
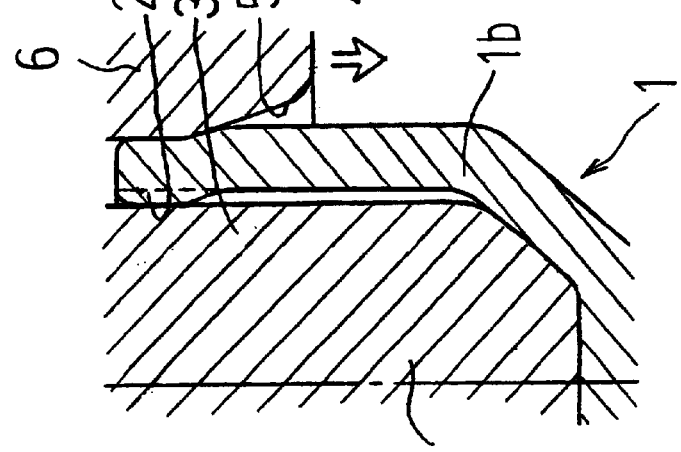
Figure 1A:
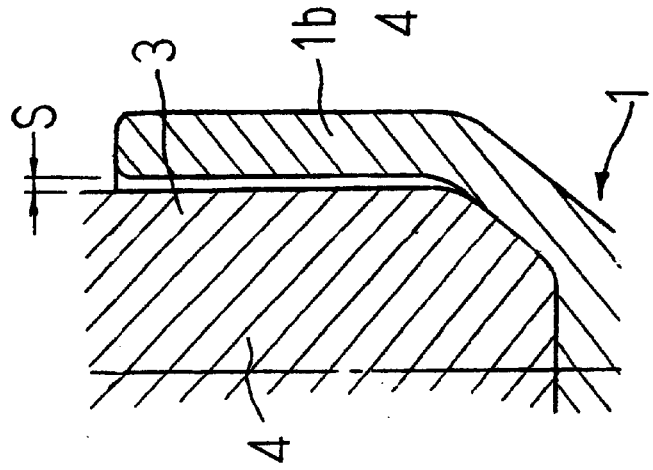

According to the present invention, as shown in FIG. 1(a) through FIG. 1(c), a punch set 4 is fitted into inner periphery of cylindrical portion 1b of the outer race 1 with an initial clearance S in the radial direction. Here the outer race 1 to be processed is a blank having been pre-formed substantially in a predetermined shape except for ball rolling grooves 2 by applying semi-hot forging. The punch set 4 can be expanded and reduced in the radial direction and has a plurality of ridges 3 of a configuration complementary to that of the ball rolling grooves 2 to be formed on the inner periphery. Under this condition, the ball rolling grooves 2 are formed on the inner periphery of the cylindrical portion 1b by ironing with the cylindrical portion 1b being pressure-inserted into a die hole 5 of a die 6 from the opening side thereof. The ironing operation is stopped when the ball rolling grooves 2 of a predetermined length is formed, while leaving the inner-most portion of the cylindrical portion 1b intact, thereby forming a margin recess 7 for a grinding wheel at the base of the ball rolling grooves 2.

The process will be described in more detail below. First, the outer race 1 which is pre-formed in substantially the predetermined shape by applying semi-hot forging except for the ball rolling grooves 2 is prepared as a blank. The outer race 1 is formed to have an inner diameter of the cylindrical portion 1b a little larger than the target diameter, so that there is an initial clearance S between the inner periphery thereof and the punch set 4 to be fitted onto the inner periphery of the cylindrical portion 1b, as shown in FIG. 1(a).

The punch set 4 can be expanded and reduced in the radial direction and has a plurality of ridges 3 of a configuration complementary to that of the ball rolling grooves 2 to be formed on the inner periphery. Then as shown in FIG. 1(a), the punch set 4 is fitted with the initial clearance S in the radial direction onto the inner periphery of the cylindrical portion 1b of the outer race 1.

Under the condition described above, namely with the punch set 4, which can be expanded and reduced in the radial direction and has a plurality of ridges 3 of a configuration complementary to that of the ball rolling grooves 2 to be formed on the inner periphery, being fitted with th initial clearance S in the radial direction onto the inner periphery of the cylindrical portion 1b of the outer race 1, the ball rolling grooves 2 are formed on the inner periphery of the cylindrical portion 1b in the ironing process wherein the cylindrical portion 1b is pressure-inserted into the die hole 5 of the die 6 from the opening side thereof and the outer periphery of the cylindrical portion 1b is ironed by the die hole 5 of the 6 while forcing the punch set 4 against the inner periphery of the cylindrical portion 1b as shown in FIG. 1(b).

Figure 2:
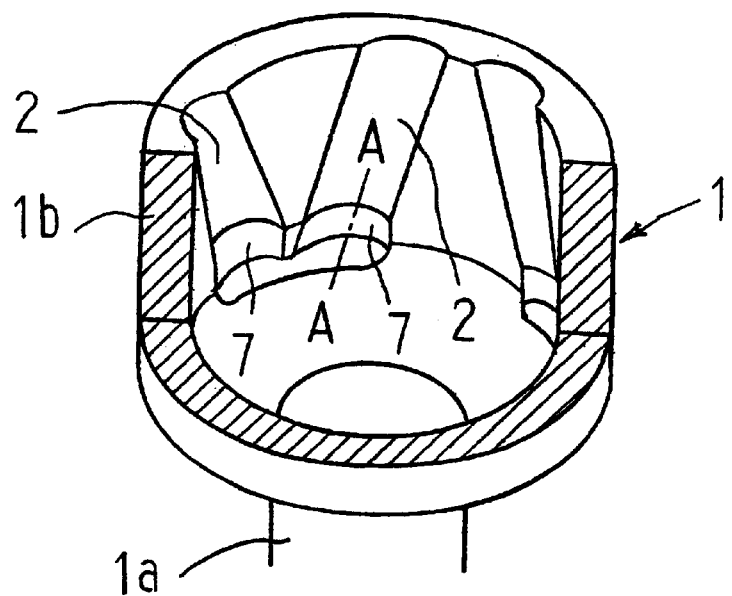
FIG. 2 is a partially cutaway perspective view of an outer race of a constant velocity universal joint formed by ironing according to the present invention.
Figure 3:
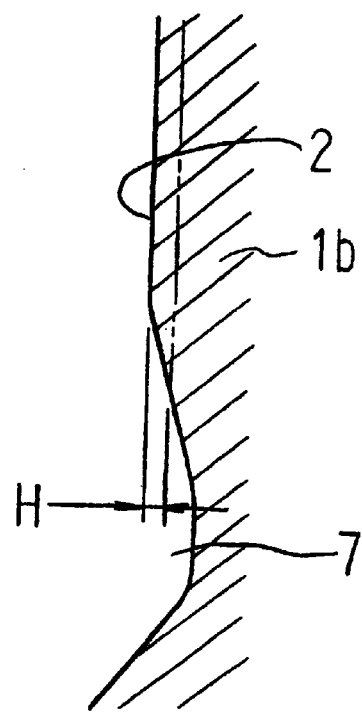
FIG. 3 is an enlarged sectional view taken along line A—A of FIG. 2.
Figure 4:
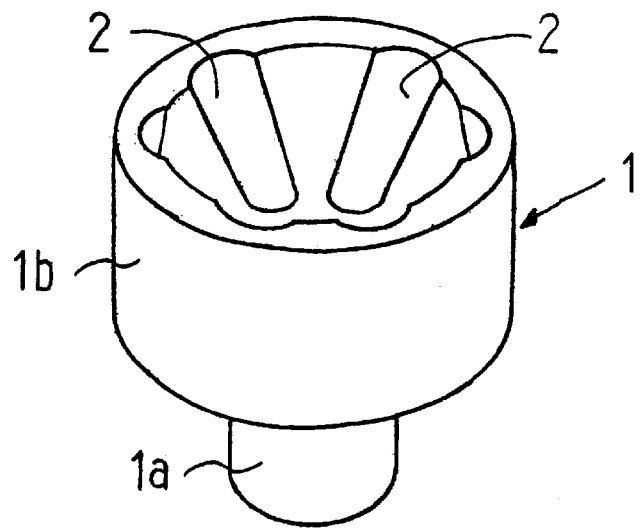
FIG. 4 is a perspective view of an outer race of a universal joint.
Figure 5:
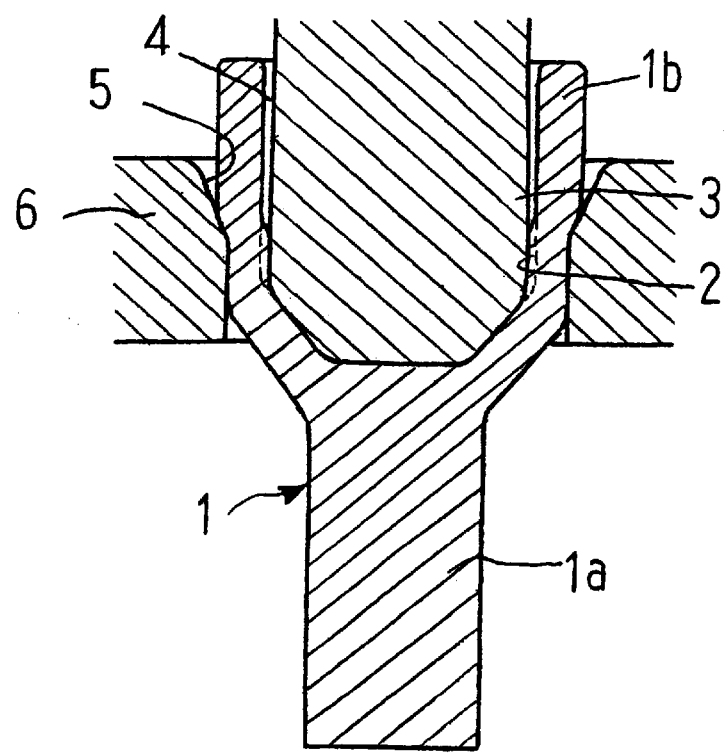
FIG. 5 is a longitudinal sectional view of an outer race of a universal joint formed by ironing according to the prior art.

Then the ironing operation is stopped when the ball rolling grooves 2 of a predetermined length is formed as shown in FIG. 1(c), thereby completing the ironing operation while leaving the inner-most portion of the cylindrical portion 1b not ironed by the punch set 4. By stopping the ironing of the ball rolling grooves 2 at the predetermined position to leave the inner-most portion of the cylindrical portion 1b not ironed by the punch set 4, the margin recess 7 for a grinding wheel which is a little larger than a grinding allowance H (refer to FIG. 3) is formed at the base of each ball rolling groove 2, as shown in FIG. 2, in the outer race being formed.

According to the present invention, since the cylindrical portion 1b is formed by ironing from the opening side thereof and the ironing operation is stopped when the ball rolling grooves 2 of the predetermined length is formed, it is made possible to form the margin recess 7 for a grinding wheel at the base of the ball rolling grooves 2 while leaving the inner-most portion of cylindrical portion 1b intact, thus eliminating the separate process employed in the prior art for forming the margin recess for a grinding wheel by cutting. In addition, since the recess 7 for a grinding wheel is formed at the base of the ball rolling grooves 2 while leaving the inner-most portion of cylindrical portion 1b intact by stopping the ironing operation midway, it is not necessary to provide the punch set 4 with a shape complementary to the margin recess 7 for a grinding wheel, thus avoiding the complication of the shape of the punch set 4.

Also since the margin recess 7 for a grinding wheel which is shallower than that formed by cutting, such troubles as the ball falling into the margin recess 7 for a grinding wheel during assembly can be avoided.

The forgoing description deals with the outer race of universal joint which has crossed grooves, but the present invention is not limited to this application and can also be applied to an outer race of a universal joint which has a plurality of ball rolling grooves formed on the inner periphery of a cylindrical portion which is integrally formed with a shaft.

According to the present invention, as described above, since the ball rolling grooves are formed by pressure-inserting the cylindrical portion of the outer race from the opening side thereof into the die and carrying out the ironing operation, then stopping the ironing operation when the ball rolling grooves of the predetermined length is formed while leaving the inner-most portion of the cylindrical portion intact thereby forming the margin recess for a grinding wheel at the base of the ball rolling groove, the separate process employed in the prior art for forming the margin recess for a grinding wheel by cutting can be eliminated, thus reducing the number of processes. The reduction in the number of processes greatly improves the productivity and also reduces the equipment cost, having a favorable effect in terms of the manufacturing cost. Also since the margin recess for a grinding wheel which is shallower than that formed by cutting is formed, such troubles as the ball falling into the drill pockets during assembly can be avoided, thus making it very easy to assemble the universal joint.

While there has been described what are at present considered to be preferred embodiments of the present invention, it will be understood that various modifications may be made thereto, and it is intended that the appended claims cover all such modifications as fall within the true spirit and scope of the invention.

What is claimed is:

1. An outer race of a universal joint, the outer race comprising:

a shaft portion;

a cylindrical portion formed on one end of the shaft portion, the cylindrical portion having an inner periphery;

a plurality of ball rolling grooves formed on the inner periphery of the cylindrical portion, the cylindrical portion being fabricated by fitting a punch set having a plurality of ridges of a configuration complementary to that of the ball rolling grooves formed on the inner periphery of the cylindrical portion into the inner periphery of the cylindrical portion of the outer race which is a blank, the ball rolling grooves being formed on the inner periphery of the cylindrical portion by ironing with the cylindrical portion being pressure inserted into a die; and a margin recess for a grinding wheel being formed at a base of each ball rolling groove by stopping the ironing operation when the ball rolling grooves are formed to have a predetermined length at the base of the ball rolling grooves by ironing with the cylindrical portion inserted from an opening side thereof, while leaving an inner-most portion of the cylindrical portion intact.

2. The outer race for a universal joint according to claim 1 wherein said ball rolling grooves are inclined by a predetermined angle with respect to the axial direction of the outer race.

* * * * *